United States Patent [19]
Takei et al.

[11] Patent Number: 4,763,293
[45] Date of Patent: Aug. 9, 1988

[54] DATA PROCESSING DEVICE FOR INTERPOLATION

[75] Inventors: Masahiro Takei, Kanagawa; Susumu Kozuki, Tokyo; Toshiyuki Masui; Masahide Hirasawa, both of Kanagawa; Motokazu Kashida, Tokyo, all of Japan

[73] Assignee: Canon Kabushiki Kaisha

[21] Appl. No.: 705,562

[22] Filed: Feb. 26, 1985

[30] Foreign Application Priority Data

| Feb. 27, 1984 | [JP] | Japan | 59-35705 |
| Feb. 29, 1984 | [JP] | Japan | 59-38338 |
| Feb. 29, 1984 | [JP] | Japan | 59-38339 |
| Mar. 1, 1984 | [JP] | Japan | 59-39288 |
| Mar. 1, 1984 | [JP] | Japan | 59-39289 |

[51] Int. Cl.$^4$ .................................... G06F 15/353
[52] U.S. Cl. .................................... 364/723; 371/31
[58] Field of Search ............... 364/723, 734; 371/31

[56] References Cited

U.S. PATENT DOCUMENTS

| 3,789,203 | 1/1974 | Catherall et al. | 364/723 |
| 4,031,369 | 6/1977 | Heaman et al. | 364/723 |
| 4,430,736 | 2/1984 | Scholz | 371/31 |
| 4,497,055 | 1/1985 | Hoshino et al. | 371/31 |
| 4,517,600 | 5/1985 | Reitmeier | 371/31 |

Primary Examiner—David H. Malzahn
Attorney, Agent, or Firm—Toren, McGeady & Associates

[57] ABSTRACT

A data processing device of the kind handling a sequence of data obtained by sampling an analog information signal to process each of the data to compute two correct data included in the data sequence; to generate by this computation at least two new data which differ from each other; and to replace an incorrect data located between two correct data within the data sequence with one of the selected new data.

22 Claims, 13 Drawing Sheets

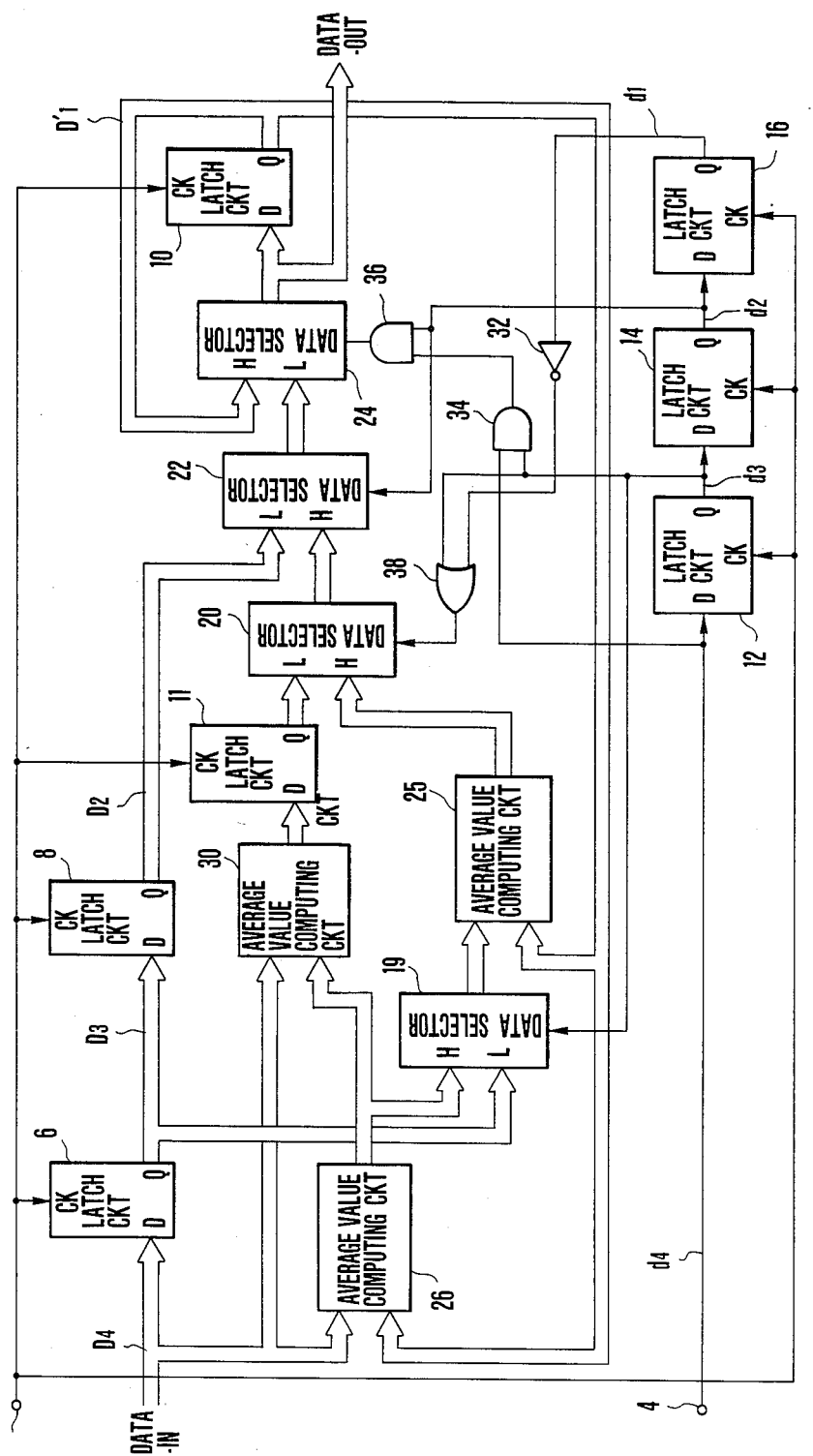

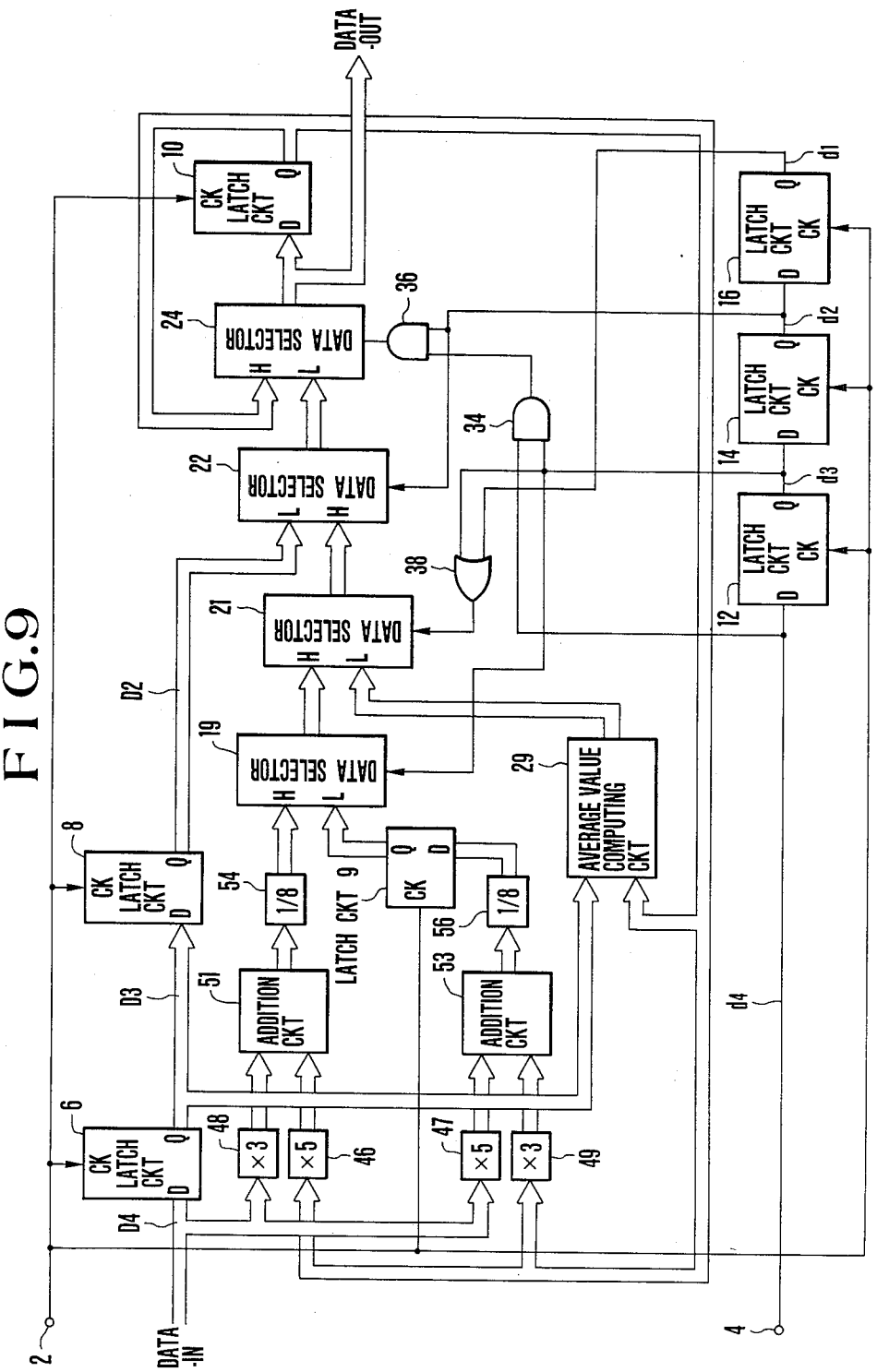

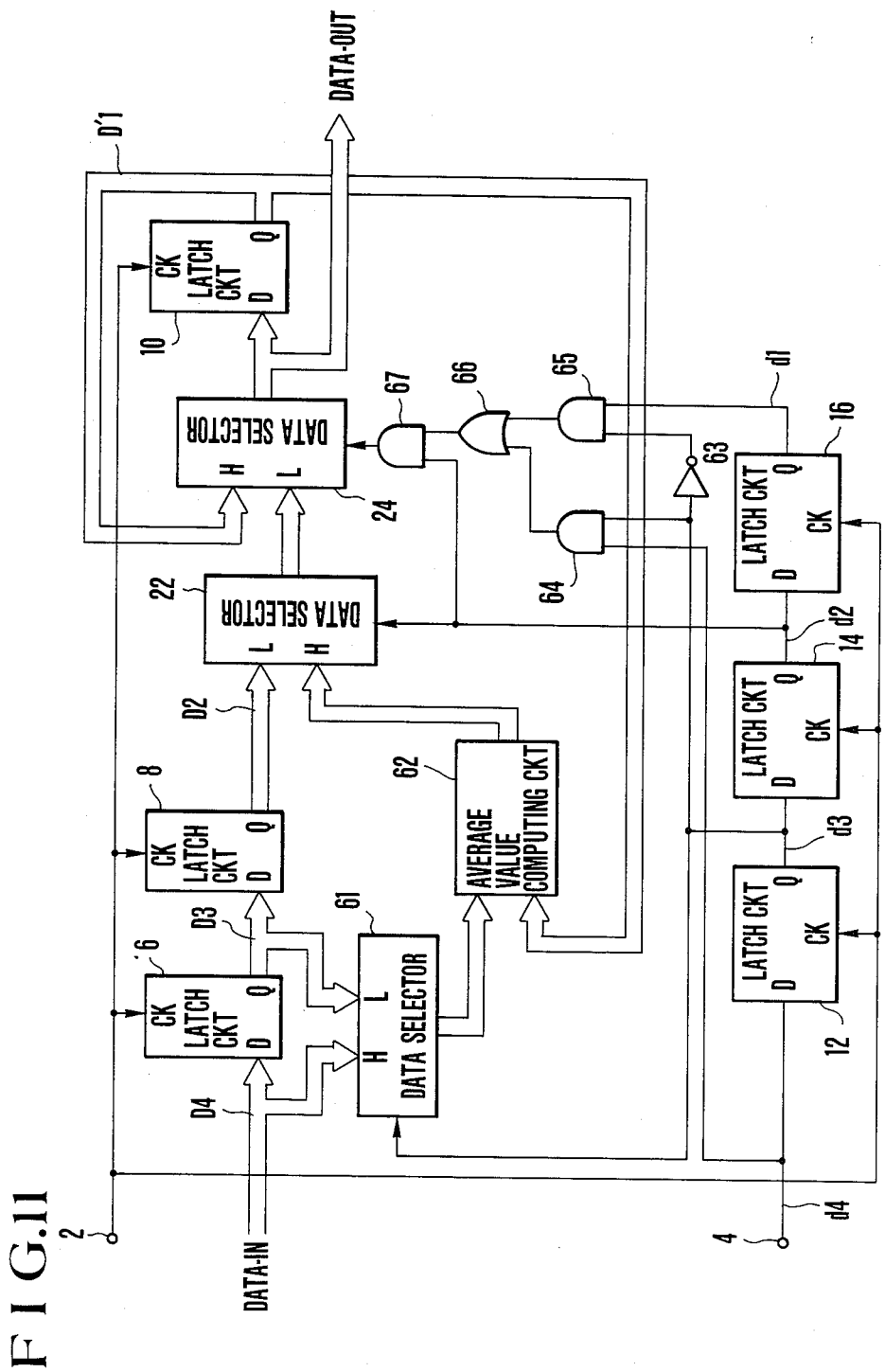
F I G. 11

F I G. 17
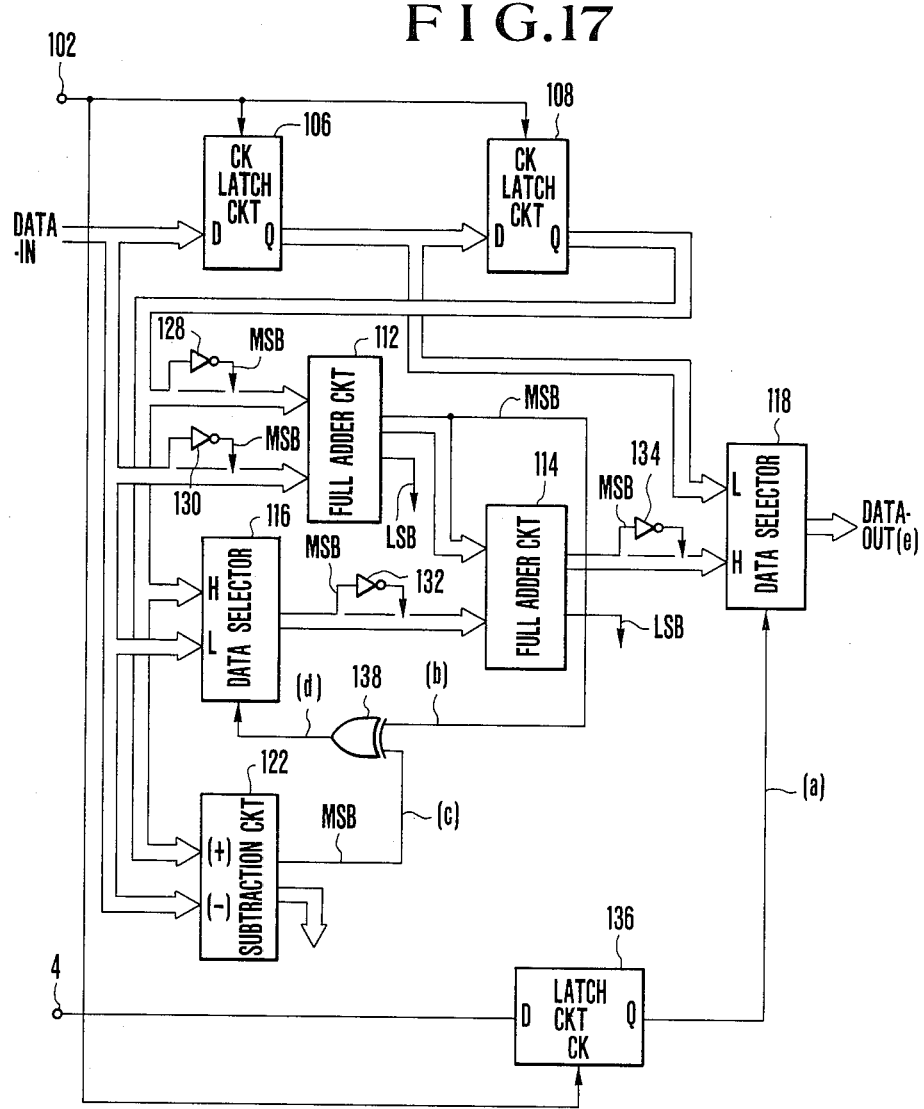

DATA PROCESSING DEVICE FOR INTERPOLATION

BACKGROUND OF THE INVENTION

1. Field of the Invention

This invention relates to a data processing device and, more particularly, to a data processing device of the kind handling a sequence of data obtained by sampling an analog information signal to process each of the data included in the data sequence.

2. Description of the Prior Art

Generally, data obtained by sampling an analog signal include some incorrect data resulting from errors and drop-outs which arise, for example, during transmission for recording or reproduction. If incorrect rate data singly arises, the general practice is to have the waveform of the original analog signal proximately reproduced by replacing the incorrect data with an interpolation data which is obtained from correct data located before and/or after the incorrect data. For example, an incorrect data arising among data obtained by sampling an audio signal is replaced with an interpolation data which is obtained by utilizing data located before and/or after the data in question. The known methods for this purpose include: A pre-hold method in which a data located immediately before an incorrect data is used as an interpolation data; an average value interpolation method in which an average value obtained from data located immediately before and after an incorrect data, is used as an interpolation data; and a tertiary interpolation method in which interpolation data is obtained from at least four data located in the neighborhood of an incorrect data.

As to the degree of proximity of the interpolation data to the original data, the pre-hold method is the poorest; the average value interpolation method is better and the tertiary interpolation method is the best of the three methods. However, the scale of the hardware arrangement required by these methods increases as the proximity increases. Particularly, in the case of the tertiary interpolation method, there must be at least two correct data before an incorrect data and two correct data after the correct data. Then, the four data, which thus span a long time period, must be computed by a large-scaled computing circuit in obtaining the interpolation data. This interpolation method thus requires complex hardware arrangement. It is, therefore, not generally employed except where an especially highly accurate interpolation is required and thus is not used for household appliances.

Whereas, the pre-hold method is advantageously characterized by the extremely simple arrangement required thereby. However, as shown in FIG. 1 of the accompanying drawings, the interpolation data obtainable by this method is not close to the original analog signal. In FIG. 1, the original analog signal is depicted with a broken line, correct data with a mark "o", an ideal interpolation data with a mark "x" and the interpolation data obtainable by the pre-hold method with a mark "Δ".

The average value interpolation method can be carried out with a simple circuit arrangement, as will be described later. However, the proximity of the interpolation data of that method to the original analog signal is insufficient as shown in FIG. 2. In FIG. 2, the broken line, the marks "o", "x" and "Δ" are used in the same manner as in FIG. 1.

Meanwhile, in the event of a plurality of consecutive incorrect data, the insufficient proximity of the interpolation data becomes poorer than in the case of a single occurrence of an incorrect data. In view of this, efforts have been exerted to avoid a consecutive occurrence of a plurality of incorrect data in recording, reproduction and communication by contriving a special arrangement of data and by including some error correction data, such as parity words or the like, in the data arrangement. Despite the above-stated efforts, however, a consecutive occurrence of a plurality of incorrect data is not actually sufficiently eliminatable. With the above-stated specially contrived data arrangement employed, two or three incorrect data tend to consecutively occur.

FIGS. 3 and 4 show the interpolation data obtained by the prior art methods in cases where two incorrect data consecutively occur. In the case of FIG. 3, interpolation data are produced by a device which obtains an interpolation data by the pre-hold method when a single incorrect data occurs. In FIG. 4, interpolation data are produced by a device which obtains interpolation data by the average value interpolation method in the event of a single occurrence of an incorrect data.

Referring to FIG. 3, in a device using the pre-hold method, all incorrect data are replaced with interpolation data of the same value as a data obtained at a point of time t2, which immediately precedes these consecutive incorrect data. Referring to FIG. 4, the device using the average value interpolation method replaces the last of the consecutive incorrect data with an interpolation data having an average value of correct data immediately before and after the consecutive occurrence of the incorrect data and the other of the consecutive incorrect data with an interpolation data of a value which is the same as that of the correct data obtained immediately before them. As shown in FIGS. 3 and 4, the interpolation data obtainable by these prior art methods clearly impair the waveform of the original analog signal. If three or more consecutive incorrect data occur, this undesirable tendency becomes more salient.

It is, of course, possible to obtain, even in the event of such a consecutive occurrence of low reliability or incorrect data, interpolation data for them in closer proximity to the original signal by using and computing several correct data located before and after these consecutive low reliability data. However, as mentioned in the foregoing, that method necessitates use of a more complex hardware arrangement and thus is not practical.

SUMMARY OF THE INVENTION

This invention is directed to the solution of the above-stated problems of the prior art devices. It is therefore an object of the invention to provide a data processing device which is capable of obtaining interpolation data in close proximity to the original signal with a simple hardware arrangement.

It is another object of this invention to provide a data processing device which is capable of obtaining interpolation data for a plurality of consecutive incorrect data in close proximity to the original signal with a simple hardware arrangement.

It is a further object of this invention to provide a data processing device which computes interpolation data in a manner suited for simplification of the required hardware arrangement.

The above and further objects and novel features of this invention will more fully appear from the following detailed description of preferred embodiments thereof taken in conjunction with the accompanying drawings.

Under these objects, a data processing device, embodying one aspect of this invention, for handling a sequence of data obtained by sampling an analog information signal to process each of the data included in the data sequence comprises: Means for generating more than two new data which differ from each other by computing first and second correct data included in the data sequence; selecting means for selecting a data from more than two new data; and replacing means for having one of the consecutive incorrect data, located between the first and second correct data within the data sequence, replaced with the data selected by the selecting means.

BRIEF DESCRIPTION OF THE DRAWINGS

FIG. 7 is a circuit diagram showing the arrangement in another embodiment of this invention.

FIG. 9 is a circuit diagram showing the arrangement in a further embodiment of this invention.

FIG. 11 is a circuit diagram showing the arrangement in a further embodiment of this invention.

FIG. 17 is a circuit diagram showing a data processing device in a further embodiment of this invention.

DETAILED DESCRIPTION OF THE PREFERRED EMBODIMENTS

Figure 1:
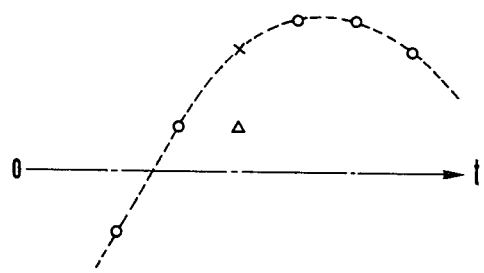
FIG. 1 shows data replacement made according to the conventional pre-hold method.
Figure 2:
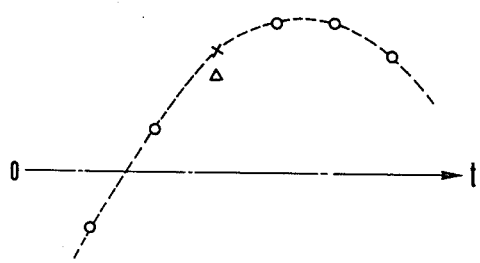
FIG. 2 shows data replacement made by the conventional average value interpolation method.
Figure 3:
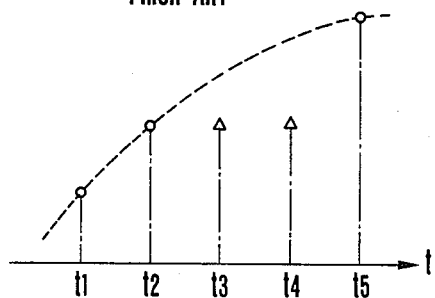
FIG. 3 shows interpolation data obtained by a conventional device using the pre-hold method in the event of the consecutive occurrence of two high error rate data.
Figure 4:
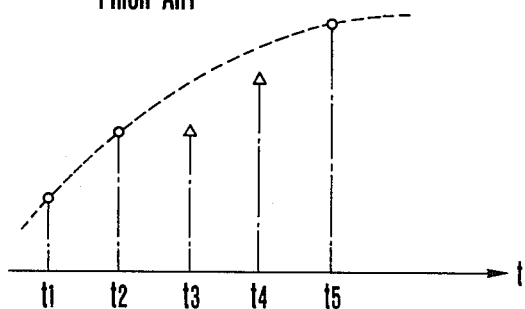
FIG. 4 shows interpolation data which are obtained by another conventional device using the average value interpolation method in the event of the consecutive occurrence of two high error rate data.
Figure 6:
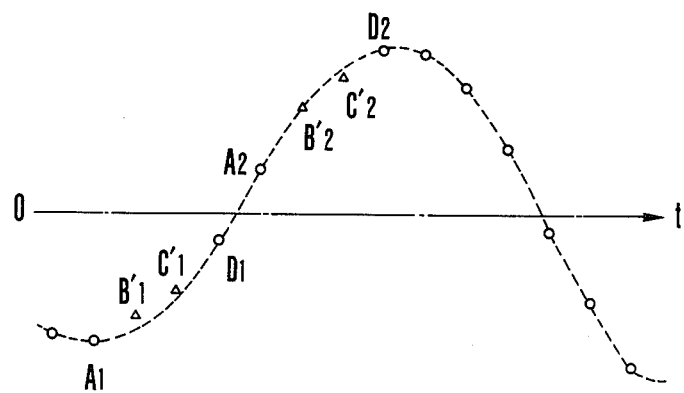
FIG. 6 shows interpolation data obtained by the device shown in FIG. 5.
Figure 5:
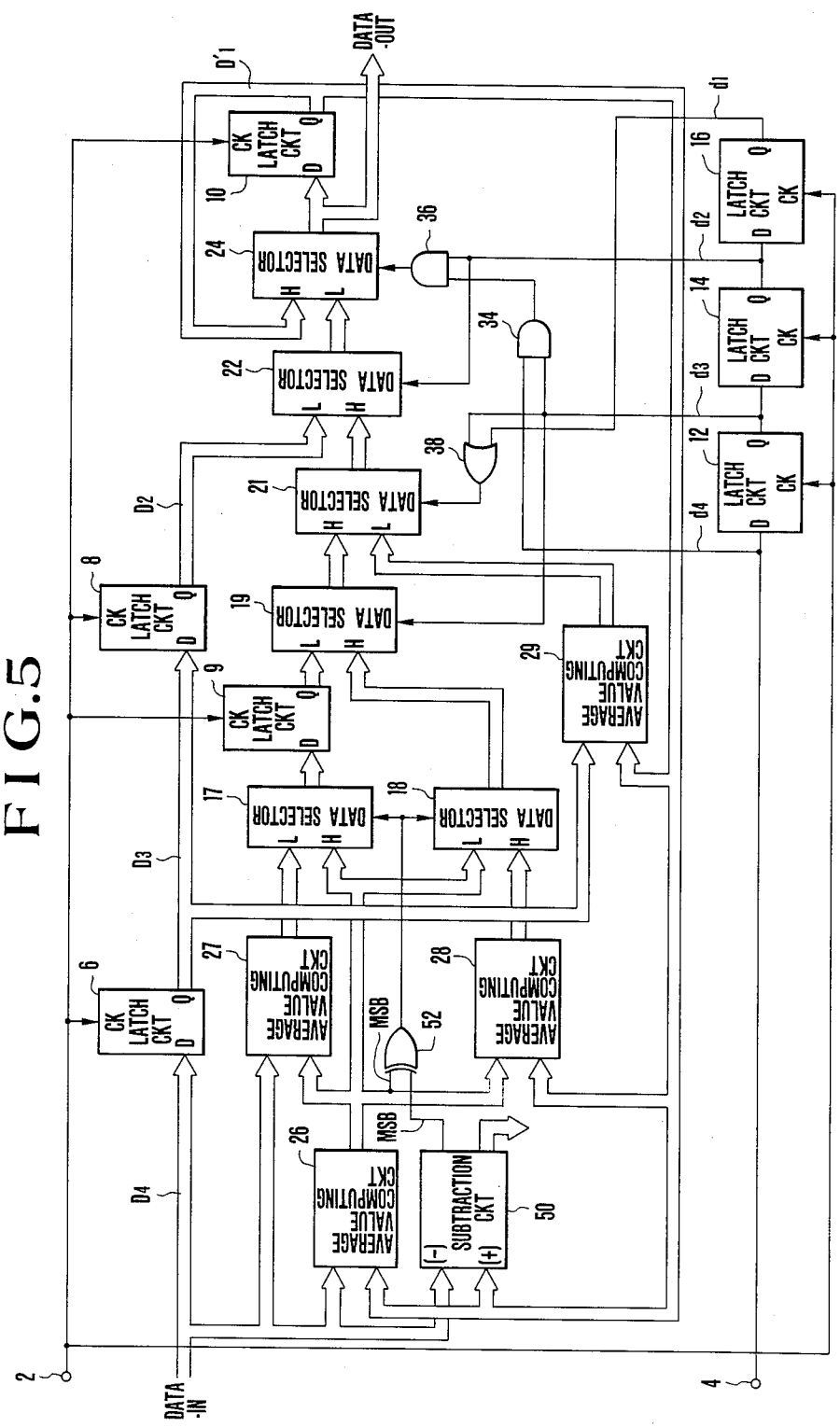
FIG. 5 is a circuit diagram showing the arrangement of a data processing device embodying this invention in an embodiment thereof.

FIG. 5 shows the arrangement of a data processing device according to this invention in an embodiment thereof. FIG. 6 shows interpolation data obtainable by the device shown in FIG. 5. Referring to FIG. 5, the illustration includes an input data DATA-IN; an output data DATA-OUT; an input terminal 2 for receiving a timing clock signal; and an input terminal 4 for receiving an error detection signal which is obtained in a known manner by means of parity words or by checking CRCC. The signal is supplied via this terminal 4 in the form of "1" when an input data is an incorrect data and in the form of "0" when the input data is a correct data. Latch circuits 6, 8, 9 and 10 respectively produce each of the received data by delaying it for one sampling period. Latch circuits 12, 14 and 16 produce each received error detection signal by delaying it for one sampling period. Data selectors 17, 18, 19, 21, 22 and 24 receive two data and selectively produce one of the two received data, respectively. Each average value computing circuit 26, 27, 28 and 29 receives two data and produces a data representing the average value of the two input data. The circuit arrangement of the embodiment further includes AND gates 34 and 36; an OR gate 38; a subtraction circuit 50; and an exclusive OR (EXOR) circuit 52.

Let us assume, for example, that data are supplied in the order of data A1, B1, C1, D1, A2, B2, C2 and D2 and that, among these data, the data B1, C1, B2 and C2 are incorrect. The device is arranged such that, in this case, the data B1 is replaced with a data (an interpolation data) of a value $(3A1+D1)/4$; the data C1 with a data of $(A1+D1)/2$; the data B2 with a data of $(A2+D2)/2$; and the data C2 with a data of $(A2+3D2)/4$, respectively.

These interpolation data are formed in accordance with a quadratic differential characteristic. In other words, with a data which is located immediately before consecutive incorrect data assumed to be A and a data which is located immediately after the consecutive incorrect data to be D, when the waveform of the original analog signal tends to protrude more in the downward direction and less upward, the consecutive incorrect data are replaced with a data series which can be expressed as $(3A+D)/4$ and $(A+D)/2$. Meanwhile, when the wave-form of the original analog signal tends to protrude more upward than downward, the consecutive incorrect data are replaced with a data series expressed as $(A+D)/2$ and $(A+3D)/4$. In other words, two different data series are prepared, each of them consisting of two data. One of the different data series is selected based on the quadratic differential characteristic of the original analog signal. It is, of course, desirable to use data which are in extremely close proximity to the original analog signal based on the quadratic differential characteristic. However, the use of such data necessitates an extremely complex hardware arrangement. Whereas, a ¼ computing circuit generally permits use of a simple hardware arrangement. The arrangement of this embodiment to interpolate with the above-stated data series is based on this fact.

The device, which is arranged as shown in FIG. 5 and as described above, operates in the following manner: Briefly stated, in the case of a single occurrence of an incorrect data, a data having the average value of data located immediately before and after the incorrect data is obtained for interpolation. In the event of the consecutive occurrence of two incorrect data, a data series which consists of a data obtained by mixing two data located immediately before and after the incorrect data in the ratio of 3:1 and a data obtained by mixing them in the ratio of 1:1 and another data series which consists of the data obtained by mixing them in the ratio of 1:1 and the data obtained by mixing them in the ratio of 1:3 are obtained, as mentioned in the foregoing. The consecutive incorrect data are replaced with one of these data series.

When three or more incorrect data consecutively arise, the last two of the three consecutive incorrect data are replaced with one selected from the above-stated data series while the first or the rest of them is replaced with a data of the same value as the data located immediately before them.

Again referring to FIG. 5, data D0, D1, D2, D3 and D4 are assumed to be received in that order with the data D4 corresponding to the data DATA-IN; and their error detection signals are signals d0, d1, d2, d3 and d4, respectively. At that instant, the data D3 and D2 are being produced from the latch circuits 6 and 8 and the error detection signals d3, d2 and d1 from the latch circuits 12, 14 and 16, respectively.

When the data D2 is correct, the error detection signal d2 is at "0" and both the data selectors 22 and 24 produce data supplied to their L inputs, as shown in the drawing. Each of the data selectors 17, 18, 19, 21, 22, 24 shown in the drawing produces the data supplied to the L input when the control input (indicated by an arrow) is at "0" and produces the data supplied to the other input H when the control input is at "1". Therefore, when the signal d2 is at "0", the output of the AND gate 36 also becomes "0". Then, the control inputs to the selectors 22 and 24 both become "0" causing them to produce the data supplied to their L inputs, respectively. As a result, the correct data D2 becomes the data DATA-OUT.

In the event that the data D2 is incorrect, on the other hand, the data D2 must be replaced with some interpolation data. If the incorrect data D2 singly arises, both the signals d1 and d3 are at "0". Since the data D1 is correct, output data (D'1) of the latch circuit 10 is the data D1. Then, the output of the average value computing circuit 29 becomes (D1+D3)/2. Furthermore, since both the signals d1 and d3 are at "0", the output of the OR gate 38, which is the control input to the data selector 21, is also at "0". Furthermore, since the signal d2 is at "1", the control input to the data selector 22 is at "1" and since the signal d3 is "0", the outputs of the AND gates 34 and 36 respectively become "0". Then, the control input of the selector 24 becomes "0". Accordingly, the data (D1+D3)/2 produced from the average value computing circuit 29 is produced as the data DATA-OUT via the input L of the selector 21, the side H of the selector 22 and the input L of the selector 24. Thus the data (D1+D3)/2 which is produced from the average value computing circuit 29 is produced as the data DATA-OUT via the input L of the selector 21, the input H of the selector 22 and the input L of the selector 24.

Next, when the data D2 happens to be the first of two consecutively arising incorrect incoming data, the device operates as follows: In that instance, the error detection signals d1 and d4 are at "0" while the error detection signals d2 and d3 are at "1". Since the data D1 is correct, the average value computing circuit 26 produces a data of a value (D1+D4)/2 and the average value computing circuit 28 produces a data of a value (3D1+D4)/4.

Meanwhile, the subtraction circuit 50 produces a data of a value (D1−D4). In this output data (D1−D4), the most significant bit is indicative of whether the original analog signal is increasing or decreasing. For example, where the data is formed by a two's complement process, the most significant bit (hereinafter referred to as MSB) of the output data of the subtraction circuit 50 indicates an increasing trend when it is "0" and a decreasing trend when it is "1". The quadratic differential characteristic of the original analog signal is considered to be as follows: When the original signal is equally generated on both sides of the zero level of a sinusoidal wave, the signal can be considered positive when it is in an upward convex and negative when it is in a downward convex. In this embodiment, therefore, the upward convexity or downward convexity of the original signal is judged from the data $$\frac{(D1 + D4)}{2}$$

produced from the average value computing circuit 26. The original signal is judged to be in upward convexity when the MSB of the data (by two's complement) is "0" and to be in downward convexity when the MSB is "1". The exclusive OR (EXOR) circuit 52 performs an exclusive OR operation on the outputs of the subtraction circuit 50 and the average value computing circuit 26. Therefore, the original signal is increasing and convexed downward when the output of the EXOR circuit 52 is "1", and is decreasing and convexed upward when the output of the EXOR circuit 52 is "0".

The data selector 18 produces a data (3D1+D4)/4 when the output of the EXOR circuit 52 is "1", and a data (D1+D4)/2 when the output of the EXOR circuit 52 is "0". The output of the OR gate 38 becomes "1" when the error detection signal d3 is "1". Then, the output data of the data selector 18 is produced as the data DATA-OUT via the inputs H of the data selectors 19, 21 and 22 and the input L of the data selector 24.

When the data d2 is the last of two incoming consecutive incorrect data, the error detection signals d1 and d2 become "1" while the error detection signal d3 is "0". Meanwhile, the latch circuit 9 produces a data which has been produced from the data selector 17 one sampling period before that time. In this instance, the data D0 is correct. Therefore, a data, produced one sampling period before from the average value computing circuit 26, is of a value (D0+D3)/2. Then, a data, produced one sampling period before, from the average value computing circuit 27, becomes (D0+3D3)/4. The data selector 17 produces a data of a value (D0+D3)/2 when the output of the EXOR circuit 52 is "1", and a data of a value (D0+3D3)/4 when the output of the EXOR circuit 52 is "0", in the same manner as the data selector 18. The output of the EXOR 52 is obtained from the data D0 and D3, as mentioned above, and shows the quadratic characteristic of the original analog signal and an increasing or decreasing trend. In this instance, the control input of the data selector 19 is "0" since the error detection signal d3 is "0". The output of the OR gate 38 is "1" since the error detection signal d1 is "1". The control input of the data selector 21 therefore becomes "1". Accordingly, the output data of the latch circuit 9 is produced from the data selector 21.

Since the error detection signal is "1", the control input of the data selector 22 is "1". Meanwhile, since the error detection signal d3 is "0", the outputs of the AND gates 34 and 36 are "0". Therefore, the output of the latch circuit 9 is thus produced as the data DATA-OUT via the data selectors 21, 22 and 24.

When three or more incorrect data consecutively arise, the embodiment operates as follows: Assuming that the data D2 is not included in the last two of the three or more consecutive incorrect data, the error detection signals d2, d3 and d4 are all at "1". Then, the outputs of the AND gates 34 and 36 become "1". As a result, the data selector 24 produces a data (D′1) of the same value as a data which was produced immediately before from the side H thereof. This data D′1 is produced as the data DATA-OUT. The data D′1 thus becomes a correct data obtained immediately before the three or more consecutive high error rate data.

If the data D2 is the next to the last among the three or more consecutive incorrect data, the error detection signal d4 becomes "0" and the other error detection signals d1, d2 and d3 become "1", respectively. Then, the output of the average value computing circuit 26 becomes (D′1+D4)/2 and that of the average value computing circuit (3D′1+4D)/4. One of these outputs is selectively produced by the data selector 18 based on the output of the EXOR circuit 52. Since the output of the OR gate 38 is "1" based on the error detection signal d3 which is "1", the control inputs of the data selectors 19 and 21 are "1". With the signal d2 being "1", the control input of the data selector 22 is "1". With the signal d4 being "0", the outputs of the AND gates 34 and 36 become "0" causing the control input of the data selector 24 to be "0". Accordingly, the output data of the data selector 18 becomes the data DATA-OUT.

When the data D2 is the last of the three or more consecutive incorrect data, the error detection signals d1 and d2 become "1" while the signal d3 becomes "0". This is similar to the above-stated case where the data D2 is the last of two incoming consecutive incorrect data. In this instance, the output of the latch circuit 9, i.e., a data which is of a value (D′0+D3)/2 or (D′0+3D3)/4, becomes the data DATA-OUT. The data D′0 in this instance has the same value as that of the correct data received immediately before the three or more consecutive incorrect data.

As is apparent from the above description of operation, the arrangement of this embodiment of the invention is capable of attaining the object of this invention mentioned in the foregoing. In the above description, there is a statement that a ¼ computing circuit permits a simple hardware arrangement. Generally, in handling a binary data, a value of ½$^x$ (wherein x represents an integer larger than 1) can be computed more simply than computation for obtaining quotients of values other than 2$^x$. Therefore, in interpolating a series of data A, B, C and D, if the data B and C are incorrect and are to be replaced, the data B and C are preferably replaced with data which can be expressed as $\{(2^x-y)A+yD\}/2^x$, wherein y represents an integer above 1 and not exceeding 2.

In the embodiment shown in FIG. 5, the two consecutively arising incorrect data are replaced with one of the two interpolation data series which are prepared on the basis of correct data coming immediately before and after the consecutive incorrect data without using any dividing operation circuit other than the ½$^x$ computing circuit. Therefore, an output data can be obtained in close proximity to the original analog signal with a relatively simple circuit arrangement.

While only two different data series have been described as selectable in accordance with the arrangement of the embodiment shown in FIG. 5, three or more different data series are, of course, selectable. For example, where the original analog signal does not have much concavity or convexity, the data A and B coming immediately before and after two consecutive incorrect data can be used; and the incorrect data may be replaced with data of values (3D+A)/4 and (D+3A)/4, respectively. In that instance, if the original analog signal has a sinusoidal waveform, the absence of much concavity and convexity in the analog signal can be detected when the absolute value of the output data (A+D)/2 of the average value computing circuit 26 does not exceed a predetermined value.

Figure 8:
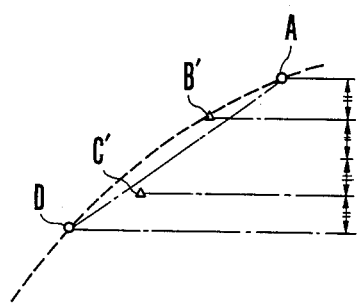
FIG. 8 shows interpolation data obtainable by the device shown in FIG. 7.

FIG. 7 shows the arrangement of a data processing device in another embodiment of this invention. In FIG. 7, the components similar to those shown in FIG. 5 are identified by the same reference numerals. Meanwhile, FIG. 8 shows the interpolating operation of this embodiment.

Assuming that the series of data A, B, C and D are incoming in the order of A, B, C and D and that both the data B and C are incorrect, the embodiment replaces these consecutive high error rate data B and C, the former with an interpolation data of a value (3A+D)/4 and the latter with another interpolation data of a value (A+3D)/4, respectively. Referring to FIG. 8, these interpolation data B′ and C′ are in close proximity to the original analog signal which is depicted by a broken line.

These interpolation data of values (3A+D)/4 and (A+3D)/4 are intended to make a linear interpolation. Generally, in the event of a consecutive occurrence of two incorrect data (B and C, for example), this part of the original signal can be linearly restored by replacing them with a data obtained by mixing the data (A and D) coming immediately before and after the incorrect data in the ratio of 2:1 into a value of $$\frac{2A+D}{3}$$

and in the ratio of 1:2 into a value of $$\frac{A+2D}{3}.$$

By this, a restored signal which is in close proximity to the original signal is obtainable. However, a computing circuit for performing a ⅓ computing operation requires a complex circuit arrangement. To solve this problem, this embodiment obtains the interpolation data B′ in the value of (3A+D)/4 and the other interpolation data C′ in the value of (A+3D)/4 since a ¼ computing circuit permits a simple hardware arrangement. The embodiment shown in FIG. 7 operates as described below:

Briefly stated, with a single occurrence of an incorrect data, an interpolation data for the incorrect data is prepared by obtaining the average value of data coming immediately before and after the incorrect data. In the event of a consecutive occurrence of two incorrect data, an interpolation data is obtained by mixing data coming immediately before and after the consecutive incorrect data in the ratio of 3:1 and another interpolation data by mixing them in the ratio of 1:3. Then, these consecutive incorrect data are replaced, respectively, with these interpolation data. Furthermore, in the event of a consecutive occurrence of three or more incorrect data, the last two of the three incorrect data are replaced with the above-stated interpolation data, which are obtained by mixing the data coming immediately before and after the three inocrect data in the ratios of 3:1 and 1:3, respectively. Meanwhile, the remaining incorrect data is replaced with an interpolation data of the same value as the data immediately before the incorrect data.

Referring to FIG. 7, the incoming data D0, D1, D2, D3 and D4 are received in the order of D0, D1, D2, D3 and D4. Of these incoming data, the data D4 is indicated as a data DATA-IN. The error detection signals d0, d1, d2, d3 and d4 are produced for these incoming data. Under this condition, the data D3 and D2 are produced from the latch circuits 6 and 8, while the error detection signals d3, d2 and d1 are produced from the latch circuits 12, 14 and 16, respectively.

When the data D2 is correct, the error detection signal d2 is "0" and both the data selectors 22 and 24 produce data supplied to their inputs L. Each of the data selectors 19, 20, 21, 22, 24 shown in the drawing produces a data supplied to the input L when a control input thereto (indicated by an arrow) is "0" and produces a data supplied to the other input H when the control input is "1". The output of the AND gate 36, therefore, also becomes "0" when the error detection signal d2 is "0". Then, both the control inputs of the data selectors 22 and 24 become "0" causing them to produce a data supplied to their L inputs, respectively. Thus, the correct data D2 becomes the data DATA-OUT without any change.

In the event that the data D2 is incorrect, the data D2 must be replaced with an interpolation data. If the incorrect data D2 is singly generated, the error detection signals d1 and d3 are "0". With the signal d3 being at "0", a data selector 19 produces a data D3 which is supplied to the input L of the selector 19. Meanwhile, since the data D1 is also at "0", the output data (D'1) of the latch circuit 10 becomes the data D1 and the average value computing circuit 25 produces a data of a value (D1+D3)/2. Furthermore, with the error detection signal d1 being "0", the output of an inverter 32 becomes "1". The output of the OR gate 38, which is a control input to the data selector 20, also becomes "1". Since the error detection signal d2 is at "1", the control input to the data selector 22 becomes "1". With the error detection signal d3 being "0", the outputs of both the AND gates 34 and 36 become "0". The control input to the data selector 24 then becomes "0". Therefore, the data of the value (D1+D3)/2, which is produced from the average value computing circuit 25, is produced as the data DATA-OUT via the inputs H of the data selectors 20 and 22 and the input L of another data selector 24.

If the data D2 is the first of two consecutively incoming incorrect data, the embodiment operates as follows: In this instance, the error detection signals d1 and d4 are at "0" while other error detection signals d2 and d3 are "1". The data selector 19 then supplies the output of the average value computing circuit 26 from the input H thereof to the other average value computing circuit 25. Since the data D1 is correct, the average value computing circuit 26 produces a data of a value (D1+D4)/2 and the average value computing circuit 25 produces a data of a value of (3D1+D4)/4, respectively. Furthermore, since the error detection signal d3 is "1", the control input to the data selector 20 is "1". With the error detection signal d2 being "1", the control input to the data selector 22 is "1". With the error detection signal d4 being "0", the outputs of the AND gates 34 and 36 become "0". As a result, the output (3D1+D4)/4 of the average value computing circuit 25 is produced as the data DATA-OUT.

In the event that the data D2 is the last of two consecutively incoming incorrect data, the error detection signals d1 and d2 become "1" and the signal d3 "0". Meanwhile, a data then produced from a latch circuit 11 is a data which has been produced from the average value computing circuit 30 during a preceding sampling period. In this instance, since the data D0 is correct, the output data which has been produced during the preceding sampling period from the average value computing circuit 26, is of a value (D0+D3)/2. As a result, a data produced from the average value computing circuit 30 during the preceding sampling period, that is, a data produced from the latch circuit 11, becomes (D0+3D3)/4. In this instance, the error detection signal d1 is at "1" and the error detection signal d3 at "0". The outputs of the inverter 32 and the OR gate 38 are both at "0". The data selector 20 then has the output of the latch circuit 11, which is of the value (D0+3D3)/4, supplied from the input L thereof to the input H of the data selector 22. With the error detection signal d2 being "1", the control input to the data selector 22 is at "1". With the error detection signal d3 being "0", the output of the AND gate 36 becomes "0". Therefore, the output data (D0+3D3)/4 of the latch circuit 11 is produced as the data DATA-OUT via the data selectors 20, 22 and 24.

In the event of a consecutive occurrence of three or more incorrect data, the embodiment operates as follows: Let us assume that the data D2 is not one of the last two incorrect data among the three or more consecutive incorrect data. In this instance, the error detection signals d2, d3 and d4 are all at "1". The outputs of the AND gates 34 and 36 become "1". Therefore, the data selectors 24 has a data (D'1) which is of the same value as that of a data produced immediately before from the input H thereof as the data DATA-OUT. In other words, the data thus produced is a correct data which is located immediately before the three or more consecutive incorrect data.

If the data D2 is the last next to the one of the three or more consecutive incorrect data, the error detection signal d4 is "0" while the error detection signals d1, d2 and d3 are respectively at "1". In that instance, the output of the average value computing circuit 26 is (D'1+D4)/2. Since the control input of the data selector 19 is "1", the output of the average value computing circuit 25 becomes (3D'1+D4)/4. Furthermore, since the error detection signal d3 is at "1" and the output of the OR gate 38 at "1", the control input to the data selector 20 is at "1". With the error detection signal d2 being also at "1", the control input to the data selector 22 is at "1". With the error detection signal d4 being "0", the outputs of the AND gates 34 and 36 are "0", having the control input to the data selector 24 at "0". Accordingly, the output (3D'1+D4)/4 of the average value computing circuit 25 is produced as the data DATA-OUT.

In the event that the data D2 is the last of the three or more consecutive incorrect data, the error detection signals d1 and d2 are at "1" and the signal d3 at "0". In this instance, the operation of the embodiment is similar to the operation performed where the data D2 is the last of the two consecutive incorrect incoming data. The data DATA-OUT then becomes (3D3+D'0)/4, in which D'0 represents the value of an incorrect data coming immediately before the three or more consecutive incorrect data.

It will be apparent from the above description that the arrangement of this embodiment shown in FIG. 7 is capable of attaining the object of this invention mentioned in the foregoing.

As mentioned in the above description of the embodiment, a ¼ computing circuit permits a simpler hardware arrangement than a ⅓ computing circuit. In handling binary data in general (a value of ½$^x$, wherein x represents an integer which is at least 1) can be computed more simply than computation for obtaining quotients of values other than 2$^x$. Therefore, in interpolating the series of data A, B, C and D, if the incorrect data B and C are to be replaced by linear interpolation, they are preferably replaced with some data that are the closest to values (2A+D)/3 and (A+2D)/3 among the data of values expressed as {2$^x$−yA+yD}/2$^x$ (wherein y represents an integer above 1 and below 2).

Figure 10:
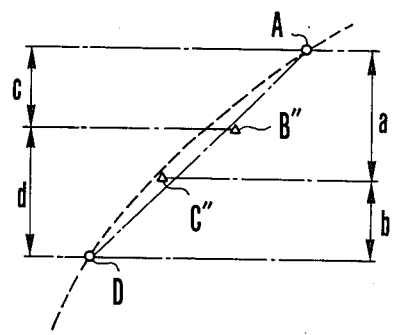
FIG. 10 shows interpolation data obtainable by the device shown in FIG. 9.

FIG. 10 shows an interpolating operation carried out with the value x, which is indicated above, set at x=3. This interpolation can be carried out by another embodiment of this invention which is arranged as shown in FIG. 9. Referring to FIG. 9, the components of the embodiment which are similar to those shown in FIG. 7 are identified by the same reference numerals. In FIG. 10, reference symbols B" and C" denote data of values (5A+3D)/8 and (3A+5D)/8, respectively.

Again referring to FIG. 9, the illustration includes the data selectors 19 and 21; the latch circuit 9; five times multipliers 46 and 47 which process received data by multiplying them by 5; three times multipliers 48 and 49 which process received data by multiplying them by 3; adders 51 and 53; and ⅛ computing devices 54 and 56 which process received data by multiplying them by ⅛. The device shown in FIG. 9 operates in the same manner as the device shown in FIG. 7. Therefore, the operation of this embodiment is omitted here.

In each of the embodiments shown in FIGS. 7 and 9, at least two of the consecutive incorrect data are replaced by interpolation which is carried out, in a manner close to linear interpolation, by using correct data coming immediately before and after the consecutive incorrect data and without using any divisional computing circuit that performs division other than ½ division. By virtue of this arrangement, both the embodiments are capable of providing data in close proximity to the original analog signals with a relatively simple circuit arrangement.

As mentioned above, each of the embodiments shown in FIGS. 7 and 9 performs interpolation which is close to linear interpolation. However, there are some cases where the original analog signal is not suited for linear interpolation. In that event, the approximating object is suitably changed.

Figure 12:
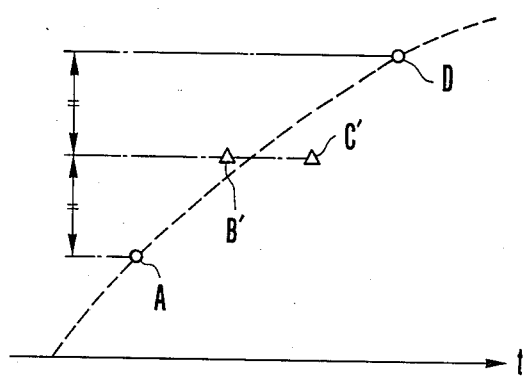
FIG. 12 shows an interpolation data obtainable by the device shown in FIG. 11.

FIG. 11 shows the arrangement of a data processing device in a further embodiment of this invention. FIG. 12 shows interpolation performed by the device of FIG. 11. The components of the device, which are similar to those shown in FIG. 5, are identified by the same reference numerals. The embodiment shown in FIG. 11 includes a data selector 61; an average value computing circuit 62; an inverter 63; AND gates 64, 65 and 67; and an OR gate 66. Compared with the embodiments described in the foregoing, the arrangement of this embodiment is simplified further. Assuming that data are supplied to the device in the order of the data A, B, C and D and that both the data B and C are incorrect, the incorrect data are replaced with interpolation data B' and C' which are of the average value $$\left(\frac{A+D}{2}\right)$$

of the data A and D. The result of the interpolation thus effected is as shown in FIG. 12. As shown, the interpolation data are in close proximity to the original analog signal which is indicated by a broken line in FIG. 12.

Referring to FIG. 11, the device operates as follows: To begin with, let us describe the basic concept of the embodiment. When an incorrect data singly arises, an interpolation data for it is prepared by averaging the values of data coming immediately before and after the incorrect data. In the event of two consecutive incorrect data, data having the average value of the data coming immediately before and after the two consecutive incorrect data are obtained and used for replacing the two incorrect data. Furthermore, in the event of a consecutive occurrence of three or more incorrect data, the last two of the three or more consecutive incorrect data are replaced with interpolation data obtained by averaging the values of the data coming immediately before and after these consecutively incorrect data, while the rest of the incorrect data is replaced with an interpolation data of the same value as the data coming immediately before these consecutive incorrect data, with the former obtained by pre-holding the immediately preceding data.

Again referring to FIG. 11, the data are supplied in the order of the data D1, D2, D3, D4 with the data D4 coming last as indicated by a symbol DATA-IN. These incoming data respectively have the error detection signals d1, d2, d3 and d4. At this point of time, the data D3 and D2 are produced from the latch circuits 6 and 8, respectively. Meanwhile, the error detection signals d3, d2 and d1 are respectively produced from the latch circuits 12, 14 and 16.

If the data D2 is correct, the error detection signal d2 is at "0". Then, both the data selectors 22 and 24 produce data supplied to their inputs L. With the signal d2 being "0", the output of the AND gate 67 is "0". Control inputs to the data selectors 22 and 24 become "0", causing these selectors to produce the data supplied to their inputs L, respectively. As a result, the data D2, which is correct, is produced as a data DATA-OUT.

If the data D2 is incorrect, the data D2 must be replaced with some interpolation data. In the event that the incorrect data D2 singly occurs, both the error detection signals d1 and d3 are at "0". Therefore, the control input of the data selector 61 becomes "0". Since the data D1 is correct, the output data D'1 of the latch circuit 10 becomes the data D1 and the average value computing circuit 62 produces an output at a value of (D1+D3)/2. Since the error detection signal d2 is "1", the data selector 22, which has the data of the value (D1+D3)/2 received at the input H thereof, supplies it to the input L of the data selector 24. Furthermore, since the signal d1 is "0", the output of the AND gate 65 is "0". With the signal d3 being "0", the output of the AND gate 64 is also "0". Accordingly, the outputs of the OR gate 66 and the AND gate 67 also become "0". As a result, the data selector 24, which has the data of the value (D1+D3)/2 supplied to the input L thereof, produces it as the data DATA-OUT.

Next, when the data D2 is the first of two consecutive incorrect data, the embodiment operates as follows: In this instance, the error detection signals d1 and d4 are at "0" while the signals d2 and d3 are at "1". Since the signal d3 is "1", the data selector 61 produces the data D4, while a data of a value (D1+D4)/2 is obtained from the average value computing circuit 62. The control input of the data selector 22 is naturally at "1" and that of the data selector 24 becomes "0", because: With the error detecting signal d1 being "0", the output of the AND gate 65 is "0". With the signal d4 being "0", the output of the AND gate 64 becomes "0". Then, the output of the OR gate 66 and that of the AND gate 67 also become "0". As a result, the data DATA-OUT becomes (D1+D4)/2.

Meanwhile, if the data D2 is the last of the two consecutive incorrect data, the error detection signals d1 and d2 are at "1" and the signal d3 at "0". In that instance, with the signal d3 being "0", the output of the inverter 63 becomes "1". Then, since the signal d1 is also at "1", the output of the AND gate 65 becomes "1". Following this, the output of the OR gate 66 becomes "1". Since the signal d1 is "1", the output of the AND gate 67 becomes "1" and the data selector 24 produces a data D'1 which is supplied to the input H thereof. As is apparent from the foregoing description, the data D'1 is a data supplied immediately before and becomes the data DATA-OUT at a value of (D0+D3)/2, wherein D0 represents the data supplied immediately before the data D1.

If the incoming sequence of data includes three or more consecutively incorrect data, the embodiment operates as follows: First, if the data D2 is not any of the last two of the three or more consecutive incorrect data, the error detection signals d2, d3 and d4 are all at "1". In this instance, the output of the AND gate 64 is at "1", that of the OR gate 66 at "1" and that of the AND gate 67 also at "1". Therefore, the data DATA-OUT becomes a data D'1, which is of the same value as a data coming immediately before the three or more consecutive incorrect data.

If the data D2 is the next to the last one among the three or more consecutive incorrect data, the error detection signal d4 is at "0", while the signals d1, d2 and d3 become "1". In this instance, since the signal d4 is "0", the output of the AND gate 64 is at "0" and that of the inverter 63 at "0". Therefore, the output of the AND gate 65 is at "0" and, accordingly, the output of the OR gate 66 and that of the AND gate 67 both become "0". Furthermore, since the control input to the data selector 22 is the error detection signal d2 which is at "1" and that of the data selector 61 the error detection signal d3 which is also at "1", the data DATA-OUT is the data of the value (D'1+D4)/2 which is produced from the selector 24. In this value (D'1+D4)/2, D'1 represents the value of the correct data coming immediately before the three or more consecutive incorrect data; and D4 the value of the correct data immediately after them. The data DATA-OUT is thus of an average value obtained from these correct data.

If the data D2 is the last of the three or more consecutive incorrect data, the error detection signals d1 and d2 are at "1" and the error detection signal d3 at "0". In this instance, the operation is similar to the above-stated case wherein the data D2 is the last of the two consecutive incorrect data. In this case, the data DATA-OUT becomes the data D'1, which is of the average value of the correct data coming immediately before and after the three or more consecutive incorrect data.

Figure 13:
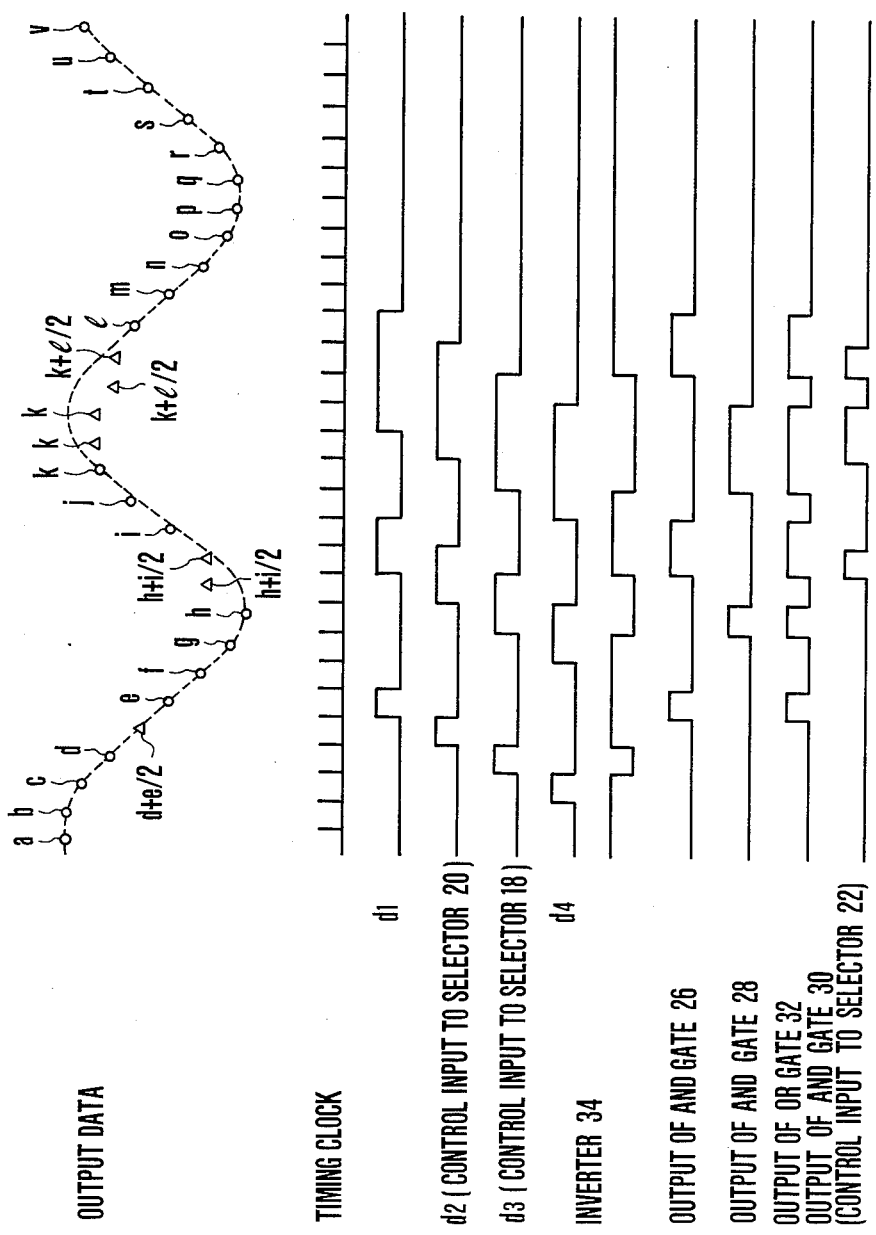
FIG. 13 is a timing chart showing the output wave forms of various parts of the device shown in FIG. 11.

As is apparent from the above description, the arrangement of the embodiment shown in FIG. 11 satisfactorily realizes the basic concept of the embodiment stated above. FIG. 13 shows, in a timing chart, the output waveforms of various points in FIG. 11. It is apparent also from this timing chart that the arrangement of the embodiment satisfactorily realizes the above-stated basic concept of operation. In the timing chart of FIG. 13, the original analog signal is indicated by a broken line; correct data by the marks "o"; interpolation data by marks "Δ"; and the values of the low error rate data by symbols "a"-"v".

Figure 14:
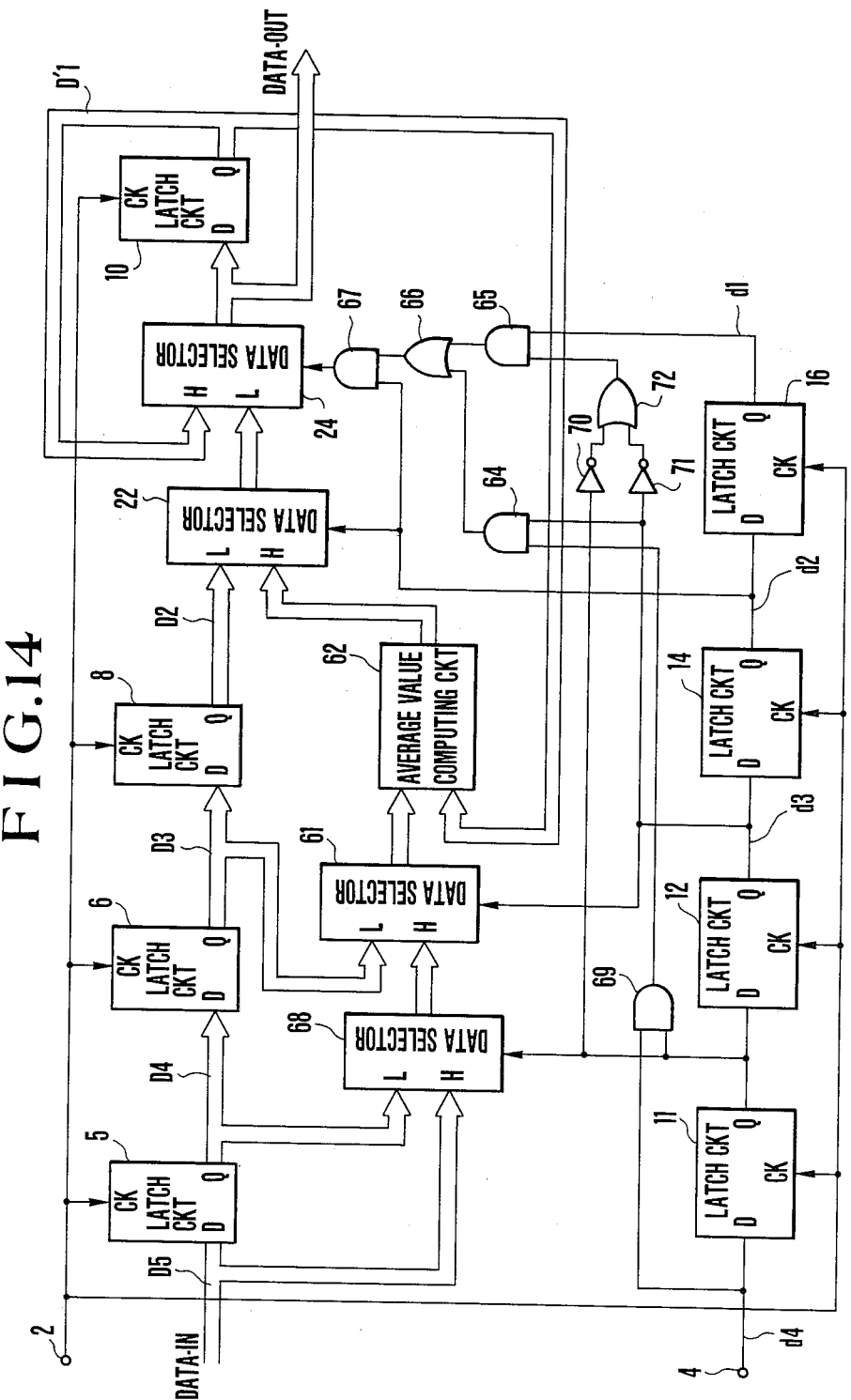
FIG. 14 is a circuit diagram showing a data processing device in another embodiment of this invention.

FIG. 14 shows the arrangement of a data processing device in a further embodiment of the invention. Components similar to those shown in FIG. 11 are identified by the same reference numerals. The embodiment includes a latch circuit 5 which delays input data by one sampling period; the latch circuit 11 which delays an error detection signal by one sampling period; a data selector 68; an AND gate 69; an OR gate 72; and inverters 70 and 71. The basic concept of operation of the data processing device shown in FIG. 14 is as follows: In the event of the consecutive occurrence of three or less incorrect data, all of the incorrect data are replaced with data having the average value of correct data coming immediately before and after the consecutive incorrect data. With four or more consecutive incorrect data, the last three of the consecutive incorrect data are replaced with data having the average value of correct data coming immediately before and after the consecutive incorrect data, while the rest of the incorrect data is replaced with an interpolation data which is obtained from the correct data coming immediately before the consecutive incorrect data through a pre-holding process, using it as it is. Further details of the operation of the embodiment are similar to the operation of the device which is shown in FIG. 11 and therefore are omitted from description here.

In accordance with the arrangement of this embodiment, as described above, at least two of the consecutive incorrect data are replaced with data of the average value of the correct data coming immediately before and after these incorrect data. This enables the embodiment to give an output data in close proximity to the original analog signal with a relatively simple circuit arrangement.

In each of the embodiments shown in FIGS. 11 and 14, the interpolation data of the average value of the correct data coming immediately before and after the consecutive occurrence of incorrect data is obtained by computation.

However, it is sometimes preferable to change the method of computation. For example, in cases where the upward convexity of the original analog signal gradually increases, the interpolation data may be obtained by mixing the values of the correct data coming immediately before and after the incorrect data in the ratio of 4:6. However, since an average value computing circuit can be very simply arranged, it is preferable to use the average value data as the interpolation data. Where the data are obtained by an offset binary arrangement, two data are fully added up. Then, with the exception of the least significant bit of the sum thus obtained, each bit of the sum is shifted down and a carry signal of a full adder circuit is used for the most significant bit to obtain a data of the average value of the two data. In this manner, the average value computing circuit can be formed singly with a full adder circuit.

Each of the embodiments shown in FIGS. 5, 7, 9, 11 and 14 has up to two data replaced with the data produced from the average value computing circuit. However, the number of data to be replaced with the average value data may be increased with an additional arrangement of the latch circuits 5, 6, 8, 9, 10, 11, 12, 14, 16, etc.

In the embodiment shown in FIG. 5, the incorrect data other than the incorrect data to be replaced with the output data of computing means is replaced with a data of the same value as the correct data coming immediately before the incorrect data. However, in the event of a consecutive occurrence of a great number of incorrect data, the device may prevent generation of a redundant DC component by producing an output data corresponding to the zero level of the original analog signal.

Figure 15:
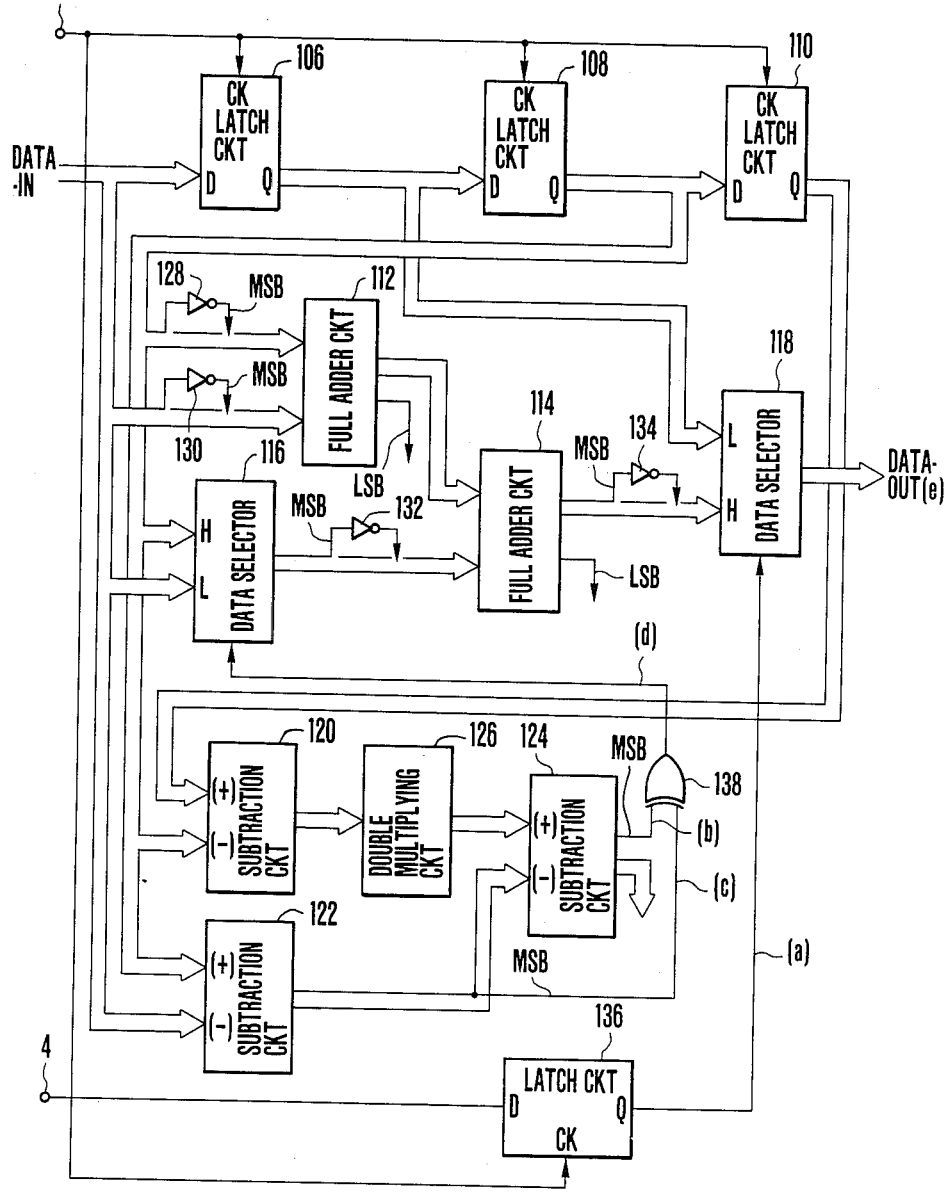
FIG. 15 is a circuit diagram showing the arrangement of a data processing device in a further embodiment of this invention.

In another embodiment of this invention, interpolation can be made in closer proximity to the original analog signal with a circuit arrangement which is more simple than linear interpolation (or average value interpolation) even in the event of a single occurrence of the incorrect data. FIG. 15 shows the arrangement of this embodiment. The illustration includes the incoming data DATA-IN and the outgoing data DATA-OUT. An input terminal 102 receives timing clock pulses. Another input terminal 104 receives a known error detection signal which is synchronized with the timing clock pulses. The error detection signal is obtained by means of a parity word or CRCC check in a known manner. The terminal 104 receives the error detection signal at "0" when the incoming data DATA-IN is correct and at "1" when the data DATA-IN is incorrect. Data latch circuits 106, 108 and 110 are actuated by the clock pulses and produce data supplied thereto by delaying them by one sampling period. The embodiment further includes full adder circuits 112 and 114; data selectors 116 and 118 each of which selectively produces one of two data supplied thereto; subtraction circuits 120, 122 and 124; a double multiplying circuit 126 which produces a data by multiplying the value of an input data twice; inverters 128, 130, 132 and 134; a latch circuit 136 which delays the error detection signal by one sampling period; and an exclusive OR (EXOR) circuit 138.

In this embodiment, the data DATA-IN and DATA-OUT are data binary coded by the two's complement method. The full adder circuits 112 and 114 of FIG. 15 respectively produce data each of which consists of a number of bits larger than the two input data by one bit (as it includes a carry bit) and form an average value computing circuit. In other words, in obtaining the average value of the two data A and B, each of the data A and B is changed from a two's complement binary coded data to an offset binary coded data. These data are fully added. Then, the least significant bit (LSB) of the result of addition is removed. The higher bits are shifted by one bit. In this manner, an average value data is obtained in the form of an offset binary coded data. The conversion between an offset binary data and a two's complement binary data is effected by inverting the most significant bit (MSB) of each data by means of the inverters 128, 130, 132 and 134.

Figure 16:
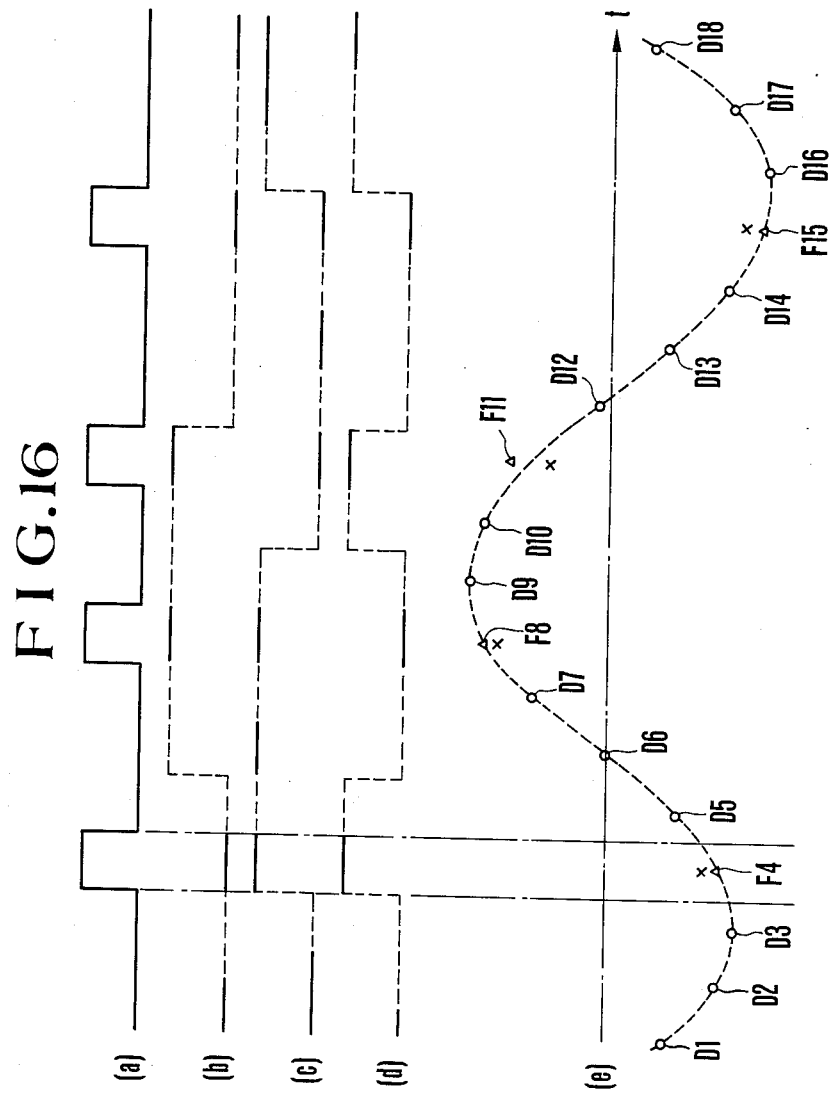
FIG. 16 is a timing chart showing the output wave forms of various parts of the device shown in FIG. 15.

FIG. 16 is a timing chart showing the waveforms of various points (a)-(e) indicated in FIG. 15. Referring now to FIG. 16, the operation of each of the component parts shown in FIG. 15 is as follows: At a part (e) in FIG. 16, correct data are indicated by the marks "o". Interpolation data obtained by the average value interpolation method are indicated by the marks "x". Interpolation data obtained by the arrangement of the embodiment shown in FIG. 15 are indicated by the marks "Δ". The original analog signal is indicated by a broken line.

In obtaining an interpolation data F4 to be used in between the correct data D3 and D5 shown at part (e) of FIG. 16, the device operates as follows: The data which is produced from the latch circuit 106 is incorrect. Accordingly, the output of latch circuit 136 becomes "1". The data selector 118 produces an output which is obtained by inverting the MSB of the output data of the full adder circuit 114 and by removing the LSB from the output data of the circuit 114 when the output of the latch circuit 136 is at "1", and produces the output data of the latch circuit 106 when the output data of the latch circuit 136 is at "0". In this instance, therefore, the data selector 118 produces the former.

In this instance, the full adder circuit 112 produces an average value data (offset binary) of the average value of the data D5 which is supplied as the data DATA-IN and the data D3 which is produced from the latch circuit 108. Meanwhile, the data selector 116 produces either the data D3 or the data D5. The output of the data selector 116 is converted into an offset binary data which is obtained as a data relative to the quadratic differential characteristic of the original analog signal. After that, the output of the data selector 116 is supplied to the full adder circuit 114 together with the average value data which is the average value of the data D3 and D5. Accordingly, the data supplied to the terminal on the input H of the data selector 118 becomes (3D3+D5)/4 when the selector 116 produces the data D3 or becomes (D3+3D5)/4 when the selector produces the data D5.

Next, the data selecting operation of the data selector 116 is as follows: The latch circuit 110 produces the data D2 which precedes the data D3. The subtraction circuit 120 produces an output (D2-D3) and the subtraction circuit 122 produces an output (D3-D5). Then, the double multiplying circuit 126 produces an output 2(D2-D3). The subtraction circuit 124 produces an output {2(D2-D3)−(D3-D5)}. The output of the subtraction circuit 124 is indicative of a quadratic differential characteristic of a part of the original analog signal between the data D2 and D5. The original analog signal has convexity in the upward direction when the output data of the subtraction circuit 124 is positive and in the downward direction when it is negative. This is because the data is obtained by the two's complement process and is indicated by the MSB (see the part (b) of FIG. 16) of the output data of the subtraction circuit 124. The signal is upwardly convexed when the MSB is "1" and downwardly convexed when it is "0". Meanwhile, the MSB of the output data of the subtraction circuit 122 (see the part (c) of FIG. 16) is "0" when the data D3 is greater than the data D5 and is "1" when the data D3 is less than the data D5.

Generally, when the data B is incorrect among time seriated three data A, B and C, the value of the original analog signal at the time of sampling the data B, that is, the value of an ideal interpolation data F, is less than the average value of the data A and C, or (A+C)/2, when the original analog signal is in a downwardly convexed shape and is larger than the average value when the signal is in an upwardly convexed shape.

In obtaining the interpolation data F4, the operation of the embodiment shown in FIG. 15 is based on this concept. When the original analog signal is upwardly convexed, i.e. when the MSB of the output data of the subtraction circuit 124 is "1", the data selector 116 produces the data D3 to D5, whichever is greater, as a data relative to the quadratic differential characteristic of the original analog signal. In other words, the selector 116 produces the data D3 when the MSB of the output data of the subtraction circuit 122 is "0" and produces the data D5 when the MSB is "1". Furthermore, with the MSB of the output data of the subtraction circuit 124 being "0", the data D5 is produced when the MSB of the output data of the subtraction circuit 122 is "0" and the data D3 is produced when the MSB of the output of the subtraction circuit 122 is "1". Accordingly, the data D3 is produced when the exclusive logical sum of the MSB of the output data of the subtraction circuit 124 and the MSB of the output data of the subtraction circuit 122 is "1" and the data D5 is produced when the exclusive logical sum is "0". In the case of the original analog signal as shown at the part (e) of FIG. 16, the output data of the subtraction circuit 124 is positive and the MSB thereof is "0". The output data of the subtraction circuit is negative and the MSB thereof is "1". The output of the EXOR 138 is at "1". Therefore, the data selector 116 produces the data D3 as a data relative to the quadratic differential characteristic. The output of the data selector 118 thus becomes (3D3+D5)/2. As is apparent from the part (e) of FIG. 16, the interpolation data of this value is in close proximity to the original analog signal. Other interpolation data F8, F11 and F15 are likewise obtained by selecting one of the two computed data as follows:

F8=(D7+3D9)/4; F11=(3D10+D12)/4; and
F15=(D14+3D16)

In accordance with the arrangement of the embodiment described above, a data having the average value of data located before and after an incorrect data is obtained and then interpolation data is obtained by adding a quadratic differential characteristic to the average value data. Therefore, the embodiment gives, despite its relatively simple hardware arrangement, interpolation data in much closer proximity to the original analog signal than the interpolation data obtained by the average value interpolation method.

FIG. 17 shows a data processing device in another embodiment of this invention. This embodiment is advantageous in cases where the original analog signal is of a waveform centered around the zero level thereof. The embodiment aims at hardware simplification. In FIG. 17, components similar to those shown in FIG. 15 are identified by the same reference numerals and their details are omitted from the following description.

Generally, an analog signal centered around its zero level is in a waveform which is upwardly convexed above the zero level and is downwardly convexed below the zero level. In view of that, the device is arranged to use the MSB of the output data of a full adder circuit 112 instead of using the MSB of the output data of the subtraction circuit 124 of FIG. 15 mentioned in the foregoing.

In obtaining the interpolation data F4 which is shown in FIG. 16, the embodiment of FIG. 17 operates as follows: The full adder circuit 112 produces a data of a value (D3+D5)/2. This results in a very reliable determination of whether the original analog signal is positive or negaetive at the time the interpolation data is obtained. The output data shows the quadratic differential characteristic of the original analog signal which centers on the zero level thereof. The original analog signal has upward convexity when the output data of the full adder circuit 112 is positive and has downward convexity when the latter is negative. The output data of the full adder circuit 112 is obtained by the offset binary process. The upward convexity is obtained when the MSB of the output data is "1" and the downward convexity is obtained when the MSB is "0". The MSB coincides with the MSB of the output data of the subtraction circuit 124 of FIG. 15 only in the case of an original analog signal which centers on its zero level. Therefore, with the data selector 116 controlled by the exclusive logical sum of the MSB of the output data of the full adder circuit 112 and the output data of the subtraction circuit 122, this embodiment gives the same advantageous effect as the preceding embodiment shown in FIG. 15.

With the data processing circuit arranged as shown in FIG. 17, a highly accurate interpolation data can be obtained with a very simple hardward arrangement.

In each of the embodiments shown in FIGS. 15 and 17, a data coming immediately before or after the incorrect data is used in obtaining a data relative to the quadratic differential characteristic of the original analog signal. If this data is further suitably arranged, an interpolation data can be obtained more accurately and in closer proximity to the original signal, although the hardware arrangement becomes somewhat more complex.

Figure 19:
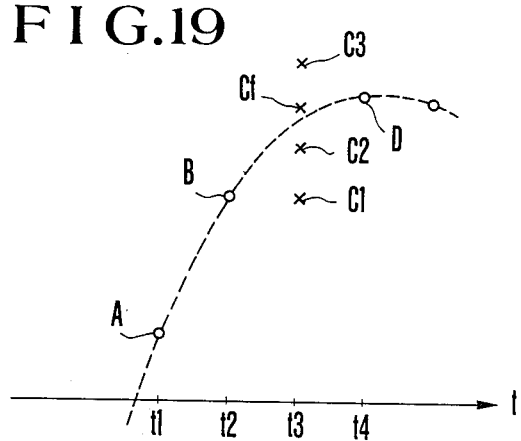
FIG. 19 shows an interpolation data obtainable by the device shown in FIG. 18.
Figure 18:
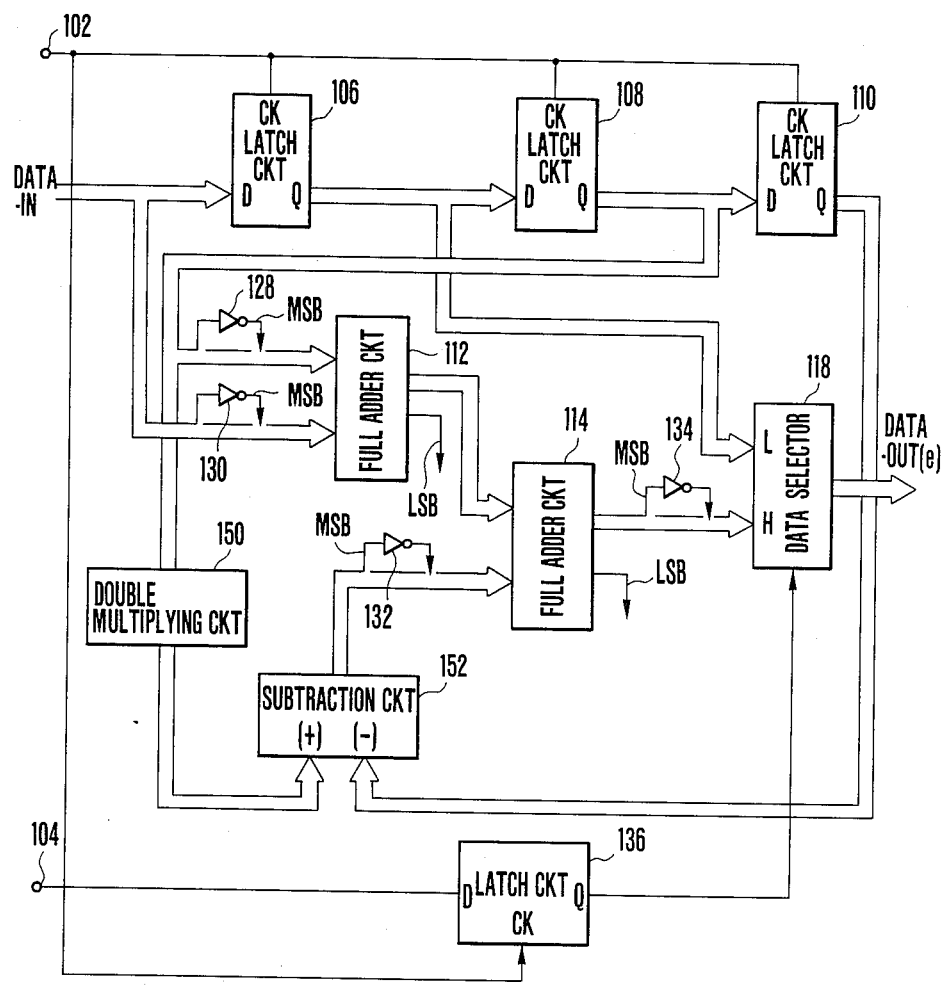
FIG. 18 is a circuit diagram showing a data processing device in a still further embodiment of this invention.

In pursuit of this possibility, a further embodiment of the invention is arranged as shown in FIG. 18. In FIG. 18, the components of the data processing circuit which are similar to those shown in FIG. 15 are indicated by the same reference numerals and details of them are omitted from the following description. FIG. 19 shows the operating principle of the embodiment shown in FIG. 18. Data A, B, C and D are consecutively sampled from an original analog signal at points of time t1, t2, t3 and t4. The data C, which is sampled at the point of time t3, is assumed to be incorrect. In this instance, the value of the original analog signal at the point of time t3 is always between two data C2 and C3. In the case of FIG. 19, the data C1 is of a value obtained by pre-holding the data B. The data C2 is of the average value of the data B and D and can be expressed as $$\frac{B+D}{2}.$$

The data C3 is obtained with the change of the signal in the part between the points of time t2 and t3 assumed to be the same as another part between the point of time t1 at which the data A is obtained and the point of time t2 at which the data B is obtained. Another data Cf has the average value of the data C1 and C3.

Since the data C3 is of a value B+(B−A), it can be expressed as 2B−A. Therefore, the data Cf is of a value very close to the original analog signal. Assuming that the data DATA-IN is the data D, the output of the latch circuit 108 the data B and that of the latch circuit 110 the data D, interpolation can be very accurately made in close proximity to the original signal by using the value 2B−A in place of the data B or D which is used as one of the inputs of the full adder circuit 114 in the device shown in FIG. 15. A subtraction circuit 152 is arranged to produce the data of value 2B−A. The MSB of this output data is inverted and is thus converted into an offset binary data. The data thus obtained is supplied to a full adder circuit 114. The circuit 114 then produces an average value data of a value $\{(5B+D-2A)/4\}$ which is the average of the values $(2B-A)$ and $(B+D)/2$.

In accordance with the arrangement described above, an interpolation data is arranged to have an average value of an average value data, which is obtained from two data immediately before and after an incorrect data, and a data of a value 2B−A which represents the quadratic differential characteristic of the original signal, so that interpolation can be carried out at a very high degree of accuracy with a relatively simple circuit arrangement.

What is claimed is:

1. A data processing device for processing data included in a sequence of data obtained by sampling an analog information signal, said device comprising:
   (a) a plurality of computing means for generating a plurality of interpolating data by processing first and second correct data included in said data sequence;
   (b) discriminating means for discriminating the quadratic differential characteristic of a part of said analog information signal relating to incorrect data located between said first and second correct data;
   (c) selecting means for selecting one of said plurality of interpolating data on the basis of an output of said discriminating means to generate a selected interpolating data; and
   (d) replacing means for replacing said incorrect data with said selected interpolating data.

2. A device according to claim 1, wherein said discriminating means discriminates said quadratic differential characteristic using only said first and second correct data.

3. A device according to claim 2, wherein said discriminating means includes first comparison means for comparing said first and second correct data with each other; computing means for computing an average value of said first and second low error rate data; and second comparison means for comparing output data of said computing means with a predetermined data.

4. A device according to claim 3, wherein there is only one incorrect data between said first and second correct data within said data sequence.

5. A device according to claim 3, wherein there are a plurality of incorrect data between said first and second correct data within said data sequence.

6. A device according to claim 5, further comprising detecting means for detecting a position of said incorrect data to be replaced with said selected interpolating data selected by said selecting means among said plurality of incorrect data located between said first and second correct data within said data sequence; and said selecting means performs selection on the basis of the output of said discriminating means and an output of said detecting means.

7. A device according to claim 1, wherein said discriminating means is arranged to discriminate said quadratic differential characteristic by using a data located immediately before a data series which consists of said first and second correct data and data located between them within the data sequence, and also by using said first and second correct data.

8. A device according to claim 7, wherein said discriminating means includes detecting means for detecting a ratio of a difference between said first and second correct data to a difference between said data located immediately before said data series and said first correct data, said discriminating means discriminating said quadratic differential characteristic based on said ratio detected by said detecting means.

9. A data processing device arranged to handle a sequence of data obtained by sampling an analog information signal and to process data included in said sequence of data being transmitted one after another, said device comprising:
   (a) computing means for computing the average value of first and second correct data included in said data sequence to generate a interpolating data; and
   (b) replacing means for replacing a plurality of incorrect data located between said first and second correct data with said interpolating data, respectively.

10. A data processing device for processing digital data included in a sequence of digital data obtained by sampling an analog information signal, and device comprising:
   (a) data series generating means which, with a first correct data included in said data sequence assumed to be A and a second correct data in said data sequence to be B, is arranged to generate a data series consisting of an n number (n being an integer) of data of a value expressed as $\{(2^x-y)A+yB\}/2^x$ (wherein x representing an integer which is at least 2 and y an integer which is at least 1, x and y being in a relation of $2y \neq 2^x$); and
   (b) replacing means for replacing the n number of data included in an m number (m being an integer larger than said n) of data which are located between said first and second correct data with said data series.

11. A device according to claim 10, wherein x=2; n=2; and said data series consists of data of values $(3A+B)/4$ and $(A+3B)/4$.

12. A device according to claim 10, wherein x=3; n=2; and said data series consists of data of values $(5A+3B)/8$ and $(3A+5B)/8$.

13. A device according to claim 10, wherein said data series generating means is arranged to generate a plurality of data series, each series consisting of an n number of data; and said device further comprises selecting means which is arranged to select one of said plurality of data series generated by said generating means and to supply the selected data series to said replacing means.

14. A device according to claim 13, wherein x=2; n=2; and said plurality of data series generated by said data series generating means include a first data series consisting of data of values $(2A+2B)/4$ and $(A+3B)/4$ and a second data series consisting of data of values $(3A+B)/4$ and $(2A+2B)/4$.

15. A device according to claim 14, wherein x=2; n=1; and said data series generating means is capable of generating a data series consisting of data of values (3A+B)/4 and (A+3B)/4.

16. A data processing device for processing data included in a sequence of data obtained by sampling an analog information signal, said device comprising:
   (a) first computing means for computing and producing a data of the average value of first and second data coming immediately before and after an incorrect data within said data sequence;
   (b) discriminating means for discriminating a quadratic differential characteristic of a portion of said analog information signal relating to said incorrect data;
   (c) selecting means for selectively producing either said first data or said second data on the basis of an output of said discriminating means;
   (d) second computing means for computing and producing a data of the average value of the output data of said first computing means and data produced by said selecting means; and
   (e) replacing means for replacing said incorrect data with the output data of said second computing means.

17. A device according to claim 16, wherein said discriminating means discriminates by using the output data of said first computing means.

18. A device according to claim 17, wherein said discriminating means includes comparison means for comparing said first and second data with each other; and said discriminating means discriminates on the basis of output data by said comparison means and the output data of said first computing means.

19. A device according to claim 16, wherein said discriminating means includes third computing means for computing a third data representing a difference between said first and second data; fourth computing means for computing a fifth data representing a difference between a fourth data, coming immediately before said first data, and said first data; and detecting means for detecting a ratio of said third data to said fifth data, said discriminating means discriminating on the basis of an output of said detecting means.

20. A data processing device for processing data included in a sequence of data obtained by sampling an analog information signal, said device comprising:
   (a) first computing means for computing and producing a data of an average value of first and second data coming immediately before and after, respectively, an incorrect data within said data sequence; said
   (b) prediction means for generating a predictive data of said incorrect data by using said first data and a third data coming immediately before said first data;
   (c) second computing means for computing and producing a data of an average of output data of said first computing means and said predictive data; and
   (d) replacing means for replacing said incorrect data with an output data of said second computing means.

21. A device according to claim 20, wherein said predictive data is obtained by linear prediction.

22. A device according to claim 21, wherein said prediction means includes subtraction means arranged to subtract said third data from a data which is twice as large as said first data; and the output of said subtraction means is said predictive data.

* * * * *